United States Patent
Ishihara

(10) Patent No.: US 6,940,563 B2
(45) Date of Patent: Sep. 6, 2005

(54) LANGUAGE SWITCHING METHOD AND DIGITAL BROADCAST RECEIVER USING THE METHOD

(75) Inventor: Kazuhide Ishihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 524 days.

(21) Appl. No.: 10/142,184

(22) Filed: May 9, 2002

(65) Prior Publication Data

US 2002/0169619 A1 Nov. 14, 2002

(30) Foreign Application Priority Data

May 10, 2001 (JP) .................................... P.2001-140593

(51) Int. Cl.$^7$ ............................ H04N 5/44; H04N 5/445
(52) U.S. Cl. .................... 348/738; 348/553; 348/563
(58) Field of Search ............................... 348/553, 738, 348/462, 465, 468, 725, 728, 705, 706, 563, 569, 564, 731, 714; H04N 5/44, 5/445, 5/50, 5/60

(56) References Cited

U.S. PATENT DOCUMENTS 6,456,331 B2 * 9/2002 Kwoh ........................ 348/465
6,661,466 B1 * 12/2003 Kou ............................ 348/553

FOREIGN PATENT DOCUMENTS

JP          2000-209520          7/2000

OTHER PUBLICATIONS

Patent Abstracts of Japan Japanese Patent No. 2000–209520 Published Jul. 28, 2000 (2 pages).

* cited by examiner

*Primary Examiner*—Sherrie Hsia
(74) *Attorney, Agent, or Firm*—Osha Liang LLP

(57) ABSTRACT

In a digital broadcast receiver, a digital broadcast receiver 10 can select an arbitrary language among plural kinds of languages and output sound by said language, and has a configuration comprising EEPROM 18 for storing the selected language, an MPU 24 for determining whether or not the selected language resides within received language data, and a sound output part 20 for outputting sound of the selected language when the selected language resides within the language data.

6 Claims, 3 Drawing Sheets

LANGUAGE SWITCHING METHOD AND DIGITAL BROADCAST RECEIVER USING THE METHOD

BACKGROUND OF THE INVENTION

1. Field of the Invention

The present invention relates to a language switching method and a digital broadcast receiver using the language switching method.

2. Description of the Related Art

In a digital broadcast, much information can be sent, so that plural languages can be provided. Then, a user selected a desired language from the provided plural languages. As its selection method, a method in which when a user makes a selection of functions using a control panel displayed on a screen of a video display device, the video display device decodes an EPG (Electronic Program Guide) signal included in a broadcast and displays the signal on the screen in a state superimposed on a video signal and provides various information about channels and programs for the user using the displayed EPG screen and further can execute any function on the EPG screen is disclosed in, for example, JP-A-12-209520.

However, according to the method described in JP-A-12-209520, the user must select a desired language every broadcast program using the EPG. For example, there is a case that in a French movie, French, Spanish, German and English are provided and in an Italian movie, French is not provided and Italian, Spanish and English are provided. In this case, a user who desires Italian must select a language such as English in the French movie and again select the language to Italian when switching to the Italian movie, and it was very troublesome.

SUMMARY OF THE INVENTION

In view of the problem, an object of the invention is to provide a language switching method in a digital broadcast receiver capable of receiving and outputting a language which a user previously selects among broadcast languages. Also, another object is to provide a digital broadcast receiver using the language switching method.

In order to achieve the object, a digital broadcast receiver according to the invention is characterized by a digital broadcast receiver capable of selecting an arbitrary language among plural kinds of languages and outputting sound by said language, comprising EEPROM for storing the selected language, an MPU for determining whether or not the selected language resides within received language data, and a sound output part for outputting sound of the selected language when the selected language resides within the language data.

By this digital broadcast receiver, a language which a user previously selects among broadcast languages can be received and outputted. Therefore, it is unnecessary for the user to perform an operation of language switching whenever a broadcast program changes, so that the program can be enjoyed comfortably.

Also, a language switching method according to the invention is characterized by a language switching method in a digital broadcast receiver capable of selecting an arbitrary language among plural kinds of languages and outputting sound data by said language, comprising the steps of storing the selected language in storage means, determining whether or not the selected language resides within received language data, and outputting sound data of the selected language when the selected language resides within the language data.

By this language switching method, a language which a user previously selects among broadcast languages can be received and outputted. Therefore, it is unnecessary for the user to perform an operation of language switching whenever a broadcast program changes, so that the program can be enjoyed comfortably.

A step of outputting language data according to the outputted sound data may be provided further in the language switching method. As a result of this, a user can easily check a language of the presently viewing broadcast.

A step of outputting data indicating a channel during reception may be provided further in the language switching method. As a result of this, a user can easily check various information (for example, a broadcast station name) about the presently viewing program.

Also, the selected language may be differentiated and displayed in the case of displaying the plural kinds of languages. As a result of this, a user can easily check the presently selected language or other languages capable of selection.

Further, a step of determining whether or not the language switching method is made valid may be provided. As a result of this, language switching which a user does not intend can be prevented.

Also, a digital broadcast receiver according to the invention is characterized by comprising means for performing language switching by the language switching method.

DETAILED DESCRIPTION OF THE PREFERRED EMBODIMENTS

Now, a description will be given in more detail of preferred embodiments of the invention with reference to the accompanying drawings.

Figure 1:
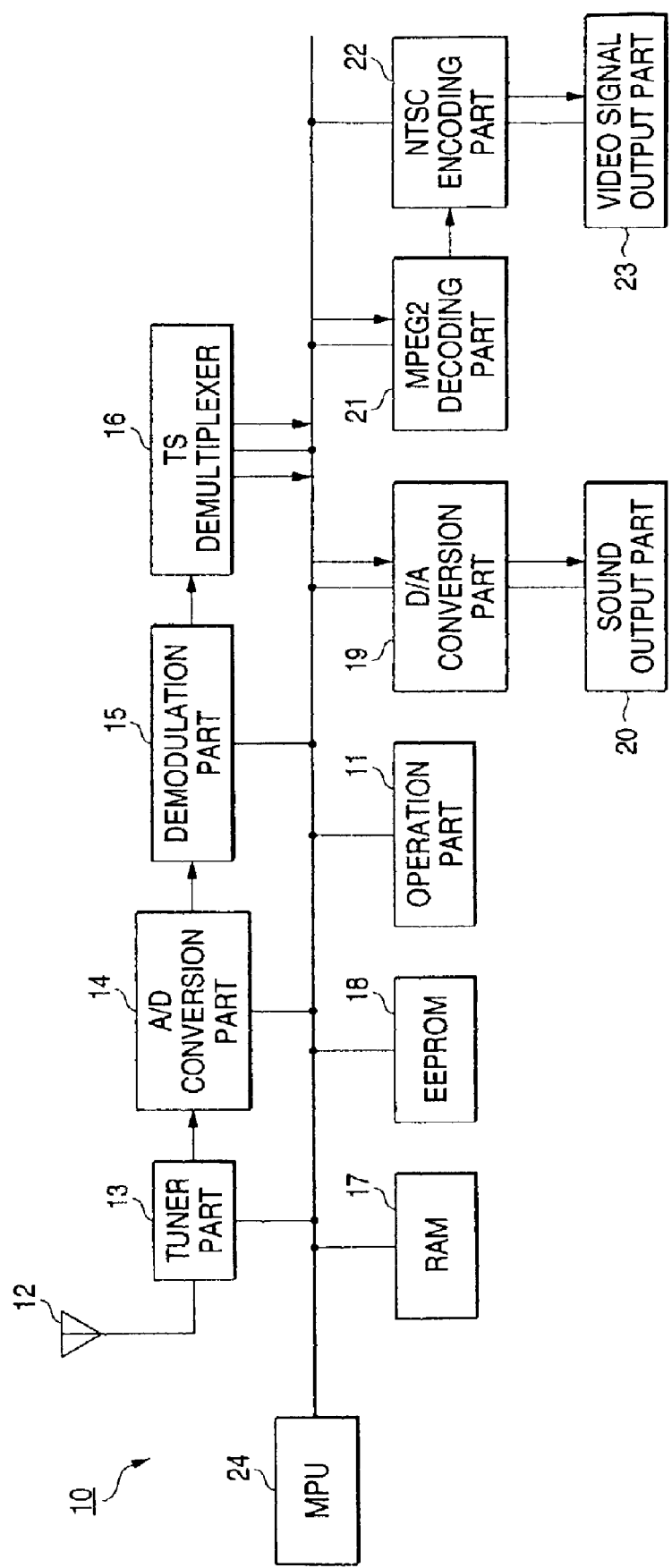
FIG. 1 is a block diagram showing a configuration of a digital broadcast receiver of the present invention.

FIG. 1 is a block diagram showing a configuration of a digital broadcast receiver 10. Numeral 11 is an operation part in which a user performs an on-off operation of a power source or performs various operations such as a selection operation of language switching about a sound to be outputted or a channel selection. Numeral 12 is an antenna part for receiving digital broadcast waves, and numeral 13 is a tuner part for selecting a broadcast of a desired channel from the broadcast waves received by the antenna part 12, and numeral 14 is an A/D conversion part for converting an output wave from the tuner part 13 into a digital signal, and numeral 15 is a demodulation part for demodulating the output to data.

Also, numeral 16 is a TS demultiplexer for separating and outputting the data demodulated by the demodulation part 15 every kind, and numeral 17 is RAM for storing the separated data, and numeral 18 is EEPROM for storing data of a language set by a user. Numeral 19 is a D/A conversion part for converting sound data of the data stored in the RAM 17 into analog, and numeral 20 is a sound output part such as a speaker for outputting the sound data converted into analog by the D/A conversion part 19.

Also, numeral 21 is an MPEG2 decoding part for decoding video data of the data stored in the RAM 17 into video data before compression, and numeral 22 is an NTSC encoding part for decoding the decoded video data into an NTSC decoding television signal, and numeral 23 is a video signal output part for outputting the NTSC decoding television signal to a monitor (not shown). Then, numeral 24 is an MPU for controlling these operations of the digital broadcast receiver 10.

Next, an operation at the time when the digital broadcast receiver 10 receives a broadcast will be described. Digital broadcast waves sent are first received by the antenna part 12. When the operation part 11 operates a channel selection, the tuner part 13 performs switching of a transponder received. The received digital broadcast waves are digitized by the A/D conversion part 14 and data is demodulated by the demodulation part 15.

Originally, a digital signal is sent from the sending side in a form of a TS (Transport Stream) packet. The TS packet includes video data, sound data, channel data, language data (information on which language a sent language is), etc. and these various data are separated and outputted by the TS demultiplexer 16 and are stored in the RAM 17. Sound data of a language matching with a language selected and set in the EEPROM 18 is converted into analog by the D/A conversion part 19 and is outputted to the sound output part 20 such as a speaker.

Also, video data is decoded into video data before compression by the MPEG2 (Motion Picture Experts Group) decoding part 21 and is decoded into an NTSC decoding television signal by the NTSC encoding part 22 to be outputted to the video signal output part 23.

Figure 2:
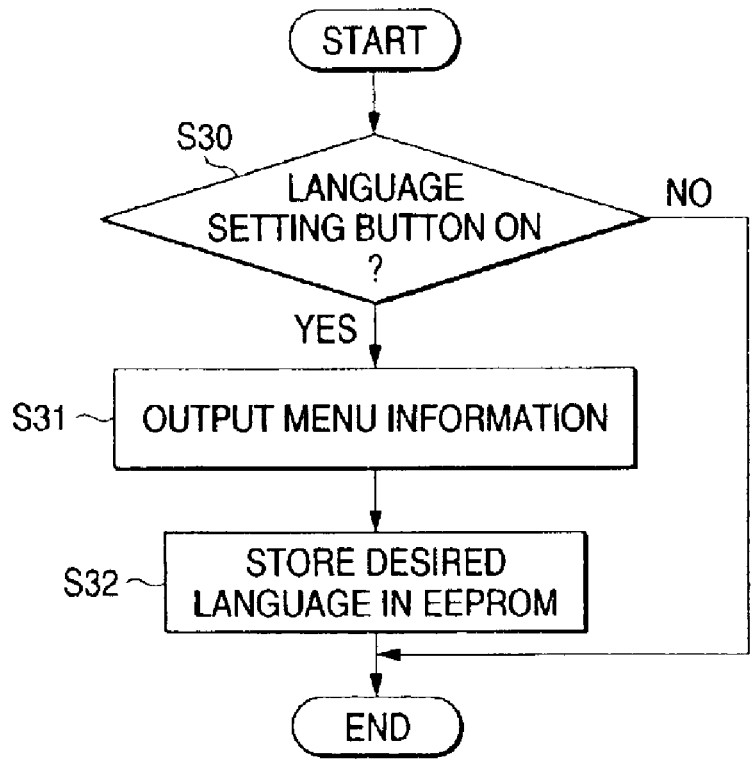
FIG. 2 is a flowchart showing a language setting operation of the digital broadcast receiver of the invention.

Next, a language switching method in the digital broadcast receiver 10 will be described. FIG. 2 is a flowchart showing an operation of the digital broadcast receiver 10 in the case of setting to a language desired by a user. In step S30, when a language setting button (not shown) provided in the operation part 11 is operated, the operation proceeds to step S31 and the digital broadcast receiver 10 reads out MENU information 40 stored in the EEPROM 18 as shown in FIG. 3 and outputs the MENU information 40 to the video signal output part 23.

When the MENU information 40 is displayed on a screen, a user can operate a pointer 41 on the screen to select a desired language. When the desired language of the user is selected, the operation proceeds from step S31 to step S32 and the selected language is stored in the EEPROM 18. Incidentally, in step S32, the newly selected language is overwritten when the preset language has been stored in the EEPROM 18.

Figure 3:
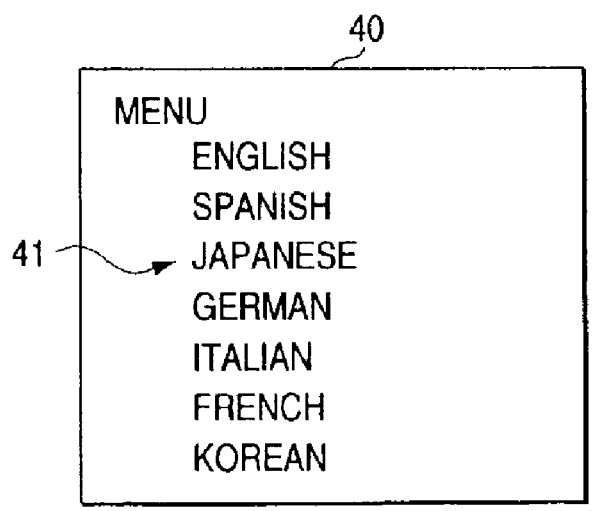
FIG. 3 is a diagram showing MENU information in the digital broadcast receiver of the invention.

Incidentally, in FIG. 3, the pointer 41 is used as means for differentiating the selected language from other languages and displaying it, but the differentiating means is not limited particularly and, for example, color of the selected language may be changed or the selected language may be blinked. Also, the MENU information 40 may be superimposed on the broadcast video to be displayed, or an image may be switched to only the MENU information 40 to be displayed.

Figure 4:
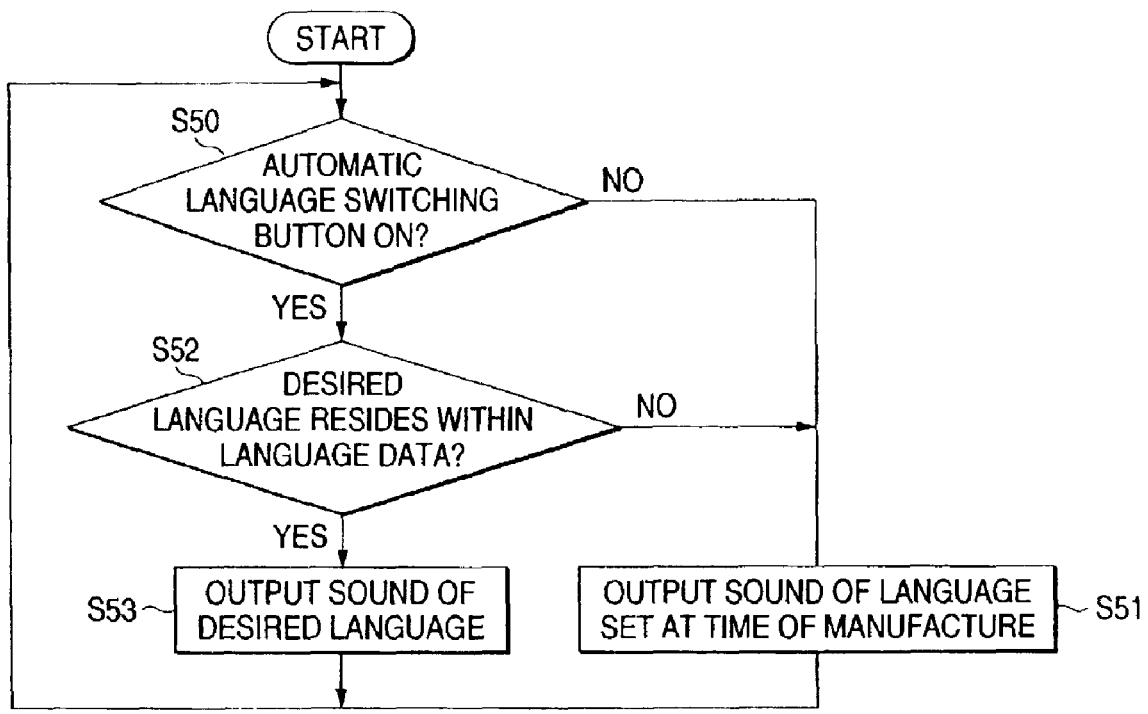
FIG. 4 is a flowchart showing a language switching operation of the digital broadcast receiver of the invention.

FIG. 4 is a flowchart showing an operation of the digital broadcast receiver 10 in the case of language switching. In step S50, it is determined whether or not an automatic language switching button (not shown) is in an ON state. Here, the automatic language switching button is means for switching whether or not a language switching method described below is made valid, and can be provided in the operation part 11. When the automatic language switching button is in an OFF state in step S50, that is, automatic switching to a language set by a user is not performed, the operation proceeds to step S51 and sound data according to a language stored in the EEPROM 18 at the time of manufacture of the digital broadcast receiver 10 is converted into analog by the D/A conversion part 19 and is outputted to the sound output part 20.

On the other hand, when the automatic language switching button is in an ON state in step S50, the operation proceeds to step S52 and the MPU 24 determines whether or not a desired language stored within the EEPROM 18 resides within language data of a TS packet.

When the desired language stored within the EEPROM 18 resides within the language data of the TS packet in step S52, the operation proceeds to step S53 and language switching is performed by converting sound data according to its language into analog through the D/A conversion part 19 and outputting the data to the sound output part 20.

On the other hand, when the language stored within the EEPROM 18 does not reside within the language data of the TS packet in step S52, the operation proceeds to step S51 and sound data according to a language stored in the EEPROM 18 at the time of manufacture of the digital broadcast receiver 10 is converted into analog by the D/A conversion part 19 and is outputted to the sound output part 20.

Thereafter, the operation returns from step S51 or step S53 to step S50, and language switching is again performed when a user changes a channel or a broadcast program changes. Incidentally, when a user does not set a language in step S52, the operation proceeds to step S51.

Figure 5:
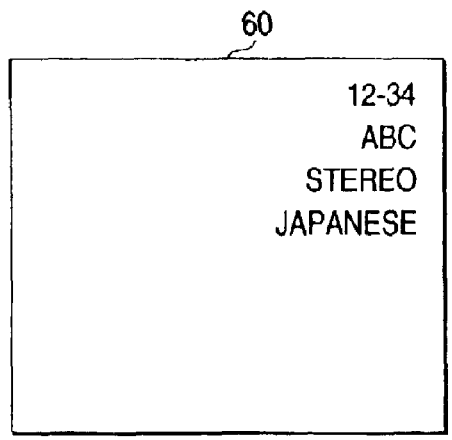
FIG. 5 is a diagram showing an image in which a language etc. in the digital broadcast receiver of the invention are displayed.

FIG. 5 is a diagram showing an image 60 in which a language etc. are displayed. The present channel number, broadcast station name, sound state and language are displayed in the upper right of the image 60. As a result of this, a user can check the language etc. of the presently received broadcast. Incidentally, the user can switch display/non-display of the image 60 arbitrarily by operating a display/non-display switching button (not shown) of the operation part 11. Also, the image 60 may be superimposed on the broadcast video to be displayed, or an image may be switched to only the image 60 to be displayed.

Incidentally, by setting languages capable of being selected by a user to plural kinds and giving priority to the languages and selecting the languages, the digital broadcast receiver 10 can be constructed so as to output sound based on its priority. As a result of this, sound of a language desired secondly or less can be outputted even when there is no broadcast of a language desired firstly by the user.

Incidentally, in the embodiment described above, a digital television in which the digital broadcast receiver is integrated with the screen for displaying an image and the sound output part for outputting sound has been described, but it may be formed of individual devices, respectively.

According to a language switching method of the invention or a digital broadcast receiver using its method, by storing a selected language in storage means and determining whether or not the selected language resides within received language data and outputting sound data of the selected language when the selected language resides within the language data, a language which a user previously selects among broadcast languages can be received and outputted. Therefore, it is unnecessary for the user to perform an operation of language switching whenever a broadcast program changes, so that the program can be enjoyed comfortably.

Also, according to the invention, in the language switching method or the digital broadcast receiver using its method, by outputting language data according to the outputted sound data, a user can easily check a language of the presently viewing broadcast.

Also, according to the invention, in the language switching method or the digital broadcast receiver using its method, by outputting data indicating a channel during reception, a user can easily check various information (for example, a broadcast station name) about the presently viewing program.

Also, according to the invention, in the language switching method or the digital broadcast receiver using its method, by differentiating and displaying the selected language in the case of displaying the plural kinds of languages, a user can easily check the presently selected language or other languages capable of selection.

Also, according to the invention, in the language switching method or the digital broadcast receiver using its method, by determining whether or not the language switching is made valid, language switching which a user does not intend can be prevented.

What is claimed is:

1. A digital broadcast receiver capable of selecting an arbitrary language among plural kinds of languages and outputting sound by said language, comprising:

an EEPROM for storing the selected language;

an MPU for determining whether or not the selected language resides within received language data;

a sound output part for outputting sound of the selected language when the selected language resides within the language data, and a display means for displaying to a user language data corresponding to the outputted sound data, wherein the language data identifies the language of the outputted sound data.

2. A language switching method in a digital broadcast receiver capable of selecting an arbitrary language among plural kinds of languages and outputting sound data by said language, said method comprising the steps of:

storing the selected language in storage means;

determining whether or not the selected language resides within received language data;

outputting sound data of the selected language when the selected language resides within the language data, and displaying to a user language data corresponding to the outputted sound data, wherein the language data identifies the language of the outputted sound data.

3. The language switching method as defined in claim 2, further comprising a step of outputting data indicating a channel during reception.

4. The language switching method as in claim 2, wherein the selected language is differentiated and displayed in the case of displaying the plural kinds of languages.

5. A language switching method comprising a step of determining whether or not a language switching method as defined in claim 2 is made valid.

6. A digital broadcast receiver comprising means for performing language switching by a language switching method as defined in claim 2.

* * * * *